Oct. 31, 1950     B. C. ROEHRL     2,527,765
FILM MOUNT

Filed Nov. 1, 1944     2 Sheets-Sheet 1

INVENTOR
BRUNO C. ROEHRL
ATTORNEYS

Oct. 31, 1950  B. C. ROEHRL  2,527,765
FILM MOUNT

Filed Nov. 1, 1944  2 Sheets-Sheet 2

INVENTOR.
BRUNO C. ROEHRL
BY
ATTORNEYS

Patented Oct. 31, 1950

2,527,765

UNITED STATES PATENT OFFICE 2,527,765

FILM MOUNT

Bruno C. Roehrl, Binghamton, N. Y., assignor to General Aniline & Film Corporation, New York, N. Y., a corporation of Delaware Application November 1, 1944, Serial No. 561,376

6 Claims. (Cl. 40—159)

This invention pertains to slides or mounts for films such as, for example, mountings for 35 mm. films. Such mountings are employed when it is desired to project color transparencies or other photographic images, although their use is by no means so limited. The invention applied to mounting pictures of all types and sizes, although at the present time, 35 mm. color transparencies are most frequently mounted in that manner and, in fact, that is the common way of preserving and of showing pictures of that type.

Most slides or mounts now used are made from paper or cardboard, either with or without glass plates between which the picture or film is held. Sometimes the glass plates are held in a very light metal frame. Those slides in which glass is employed are rather expensive, require a great deal of care in assembly and, since the glass is relatively thin, it can be easily broken in which event the picture is most always damaged, perhaps to an extent rendering it of no further use. The paper or cardboard mountings most commonly to be found are objectionable in that they leave the film exposed and, therefore, subject to becoming scratched or otherwise rendered unfit or at least more undesirable for its intended purpose. Paper or cardboard frames have very little rigidity and are subject to distortion, thereby warping the film so that it is exceedingly difficult to focus it, and sometimes buckling it to a point where it is no longer possible to project a sharply defined image.

To overcome the above-mentioned difficulties a slide or mount in which the film is held flat, protected against scratches or other damage, and by which it may be sealed against moisture or dirt, has been devised. This mount is molded or otherwise fabricated from relatively cheap plastic material and comprises a holder or frame and a cover between which is held the mask and film. The invention is herein described by reference to a holder or frame having projecting means from one member engageable in openings in the other member, said projecting means being so positioned as to engage perforations at the edge of the film, e. g. 35 mm. film. If the film is of a type having no perforations, then of course, the slide will provide for positioning and retaining the film without the above-mentioned projections. The central portion of both the cover and frame comprise flat, smoothly polished surfaces through which light my pass in projecting the film. The cover is also adapted to be permanently attached to the frame by some type of adhesive, or by application of heat in the event the plastic employed is of a thermo-plastic material, or of some suitable solvent.

Such a slide has the advantage of resisting distortion and yet, is not subject to injury as is a slide of glass. It may also be produced cheaply in large quantities by some one of the well-known processes of molding plastic materials. The mask and film are very easily inserted, whereupon, the cover is put in place and either permanently attached by welding or fusing the parts together or, if a permanent seal is not desired, some adhesive or a very slight connection by application of heat at spaced points only may serve. If desired, the complete joint between the cover and frame may be cemented or welded, thereby hermetically sealing the film.

One embodiment of the invention is hereinafter described by reference to the accompanying figures of drawing in which.

Figure 1:
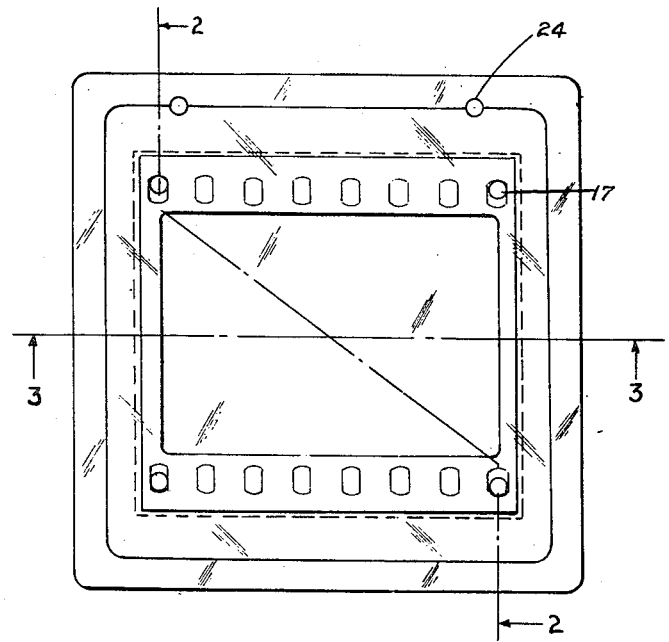
Fig. 1 is a plan view of an assembled slide or mount constructed in accordance with the invention.

Now referring to the figures of drawing, the slide comprises a frame 10, and the cover 11 between which are held the mask 12 and film 13 or other material to be mounted. The frame and cover are preferably to be cast from some optically clear, transparent, thermo-plastic material. While the invention is by no means limited to any particular material, the following materials have been employed successfully: methyl-methacrylate, styrene, ethyl cellulose, cellulose acetate butyrate, and cellulose acetate. The first of these is preferred since it has optical qualities surpassing those of glass, is easily molded, is not subject to shrinking or distortion beyond limits which may be tolerated, and can withstand rough handling. Generally speaking, thermo-plastic materials having harder flows are more desirable than those characterized by softer flows.

The molding of the plastic may be accomplished in any satisfactory manner, but is preferably accomplished by injection molding, compression, transfer, jet, or other well-known methods. The mold is gated at one of its corners so that material to be trimmed may be easily cut and the surface at which it is cut polished or otherwise smoothed.

Now referring to Figs. 1–4, the frame is formed with a cavity defined by the rectangular outline 14. This cavity is of a depth equal to approximately one-half the thickness of the material. A relatively shallow recess 15 in the form of a hollow rectangle defined by the outlines 14 and 16 allows for insertion of the mask 12. The surface inside rectangular outline 16 is therefore raised with respect to the recess 15, and should be on, or practically on, the same plane as the surface of the mask when inserted. In other words, the thickness of the mask and the depth of the recess within which it must fit are practically the same. A plurality of projections 17 in the form of circular pins extend upwardly from recess 15, and these are so spaced that they engage perforations at the side of the film. Of course, if the film to be mounted is not of perforated type, then there need be no pins or projections. Likewise, it is not essential that the pins be employed for perforated film, although their use is of assistance in making certain that the film does not become displaced, especially in the event the slide is sealed.

Figure 2:
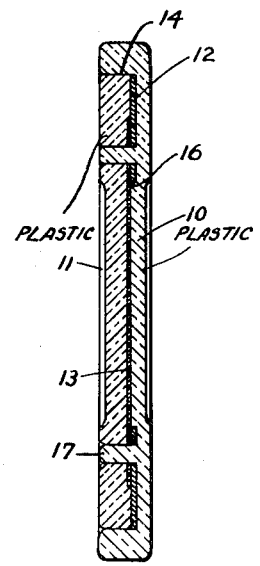
Fig. 2 is a section taken at line 2—2, Fig. 1.
Figure 3:
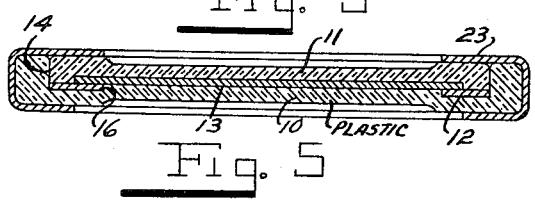
Fig. 3 is a similar section taken at the line 3—3 and showing a modified form of mask.

As shown in Figs. 2 and 3, the outer surface of the frame is recessed slightly, at least for an area as great as the frame of the picture. The surface of the plastic material is given a suitable polish, or is at least of such a quality that light is not diffused or refracted in any way which would tend to interfere with proper projection. The fact that the surface through which light passes in projection is recessed, prevents that surface from becoming scratched or otherwise damaged as the slides are handled, either during projection or in storage.

Four projections 17 are illustrated and they are positioned to engage perforations at the corners of the film. Of course, any other number of projections or pins may be employed, and they may be centrally located rather than being positioned at the corners. One alternative is that of having two pins, one at each of two diagonally opposite corners.

Figure 5:
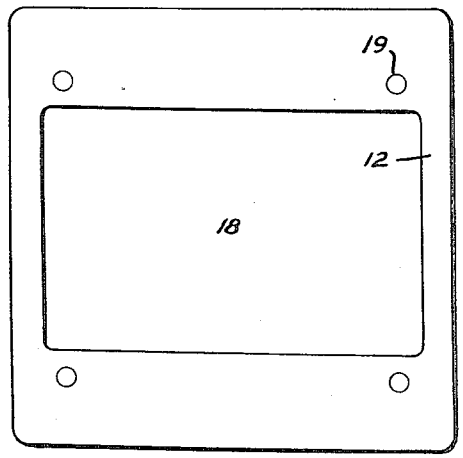
Fig. 5 is a plan view of the mask.
Figure 4:
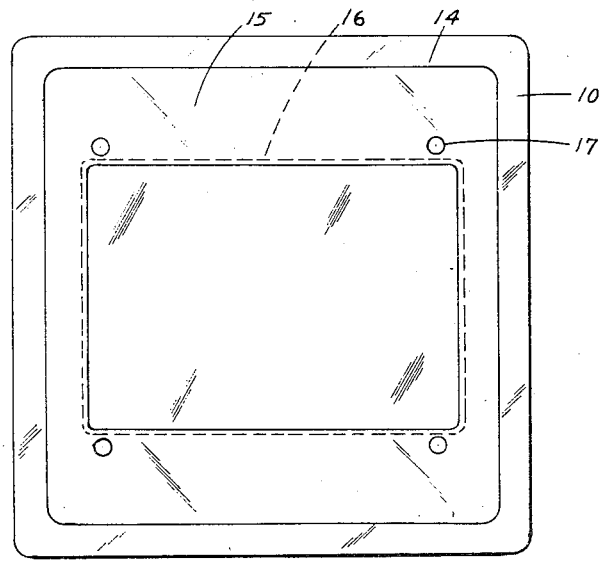
Fig. 4 is a plan view showing details of the frame.

Now referring to Fig. 5, the mask 12 is preferably to be made from some opaque material such as cardboard. The opening 18 defines the frame of the picture, and its dimensions are based on the size of the picture frame for the particular film being mounted. A plurality of holes 19 register with the pins 17, and clearances for these holes and for the mask itself as it fits within the recess 15 are such that for commercially practicable molding, the frame recess will always take the mask, and the holes 19 will always register with the pins so that it it not necessary to do any trimming or to enlarge the holes at assembly.

Figure 6:
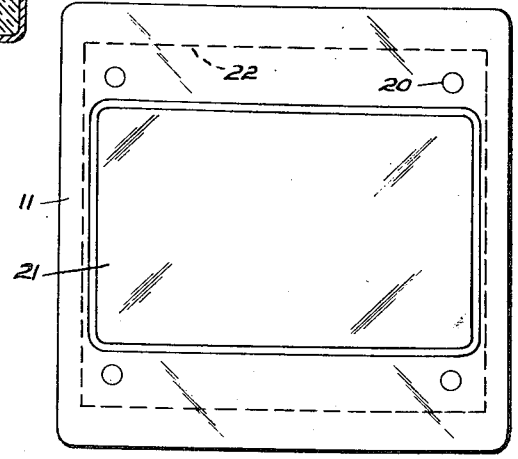
Fig. 6 is a plan view of the cover.

In Fig. 6, the cover 11, molded in a manner similar to that by which the frame is molded, should fit within the cavity in the frame with slight lateral clearance. Holes 20 register with the pins 17 and are a few thousandths of an inch larger than the pins so as to assure easy assembly. The outer face of the cover is recessed as at 21 to correspond with the recess in the frame, Fig. 4. The inner face is also centrally recessed to a depth equivalent to the thickness of the film to be mounted, such recess being defined by the dotted line rectangle 22. That should be slightly larger than the outside dimensions of the film bearing the photographic image. In the event the film is to be positioned by pins such as pin 17, it is not necessary that there should be any close fit between the film and the retaining recess just described. However, if there are no pins, then the film will be positioned and retained by the recess in the cover, and it should be of width slightly greater than the width of the film to be accommodated, while its length may be arbitrarily chosen within reasonable limits. Since the film is normally cut, it can be trimmed to fit the recess in that direction. Since many modern cameras do not leave a great deal of blank film between exposures, the length of the recess should not be much greater than the frame of the picture.

Figure 7:
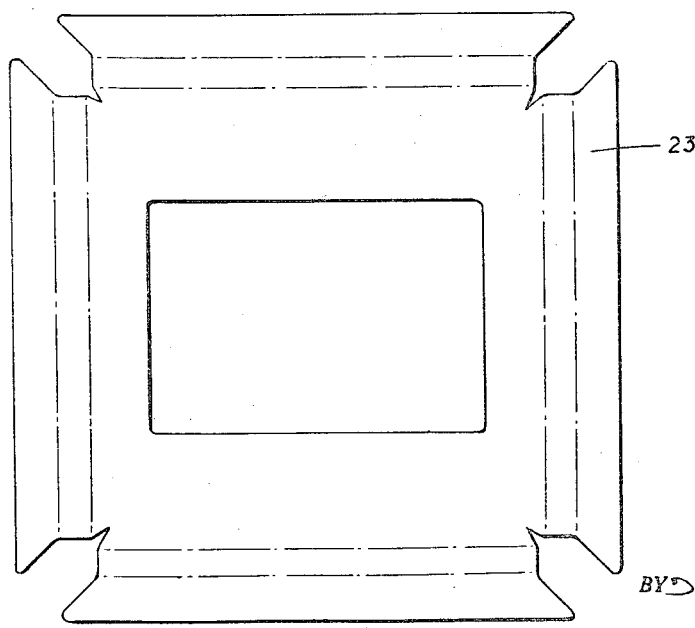
Fig. 7 is a plan view of a modified mask.

It is preferable that the mask be located as shown herein, that is, next the film. However, as an alternative construction, the cavity within the frame may not be recessed as at 15, and a mask may be applied to the outside of the assembled slide as shown at 23, Figs. 3 and 7. That mask may comprise a generally rectangular paper or other element having an opening at its center equivalent to the frame of the picture, and tabs at either side. It is wrapped about and secured to the assembled slide by any suitable adhesive material. Such a mask may be employed where the frame and cover are not recessed at their outer faces. Then the thickness of the masking material acts as a rim or pad at the edge and prevents contact at the center of the slide thereby preventing damage at those areas. The mask 23, shown in Fig. 7 to a smaller scale than are the parts of the other figures, is wetted and placed adhesive side down to the assembled cover and frame with its central rectangular opening in registry with the scene to be projected and is then folded about the assembled mount, as at the dot and dash lines, Fig. 7. Then it is held until it has become permanently adhered in place. The section thereof at Fig. 3 merely indicates how this alternate form of mask is employed and it is to be understood that normally only one mask would be used.

The cover may be affixed in place by an adhesive material and may be rendered water-tight by using adhesives which are not water-soluble. It is also intended that the thermo-plastic material be fused or welded together at the points such as the points 24. If it is also desired to seal the interior of the slide against entry of moisture or foreign matter, the entire periphery of the cover may be fused with or adhered to the adjoining part of the frame as should be the holes 20 and pins 17 if such pins are a part of the structure. The attachment may be made by application of heat, or may be effected by use of suitable solvents or adhesives.

Normally the picture frame or format will come at such a position relatively to the perforations in the film that the latter can be cut or trimmed to fit the holder, engage over the pins and yet, still have a desired picture area properly masked. Standards are such that the projector apertures are slightly less than camera apertures and therefore, there is a certain amount of picture area with which to compensate for variations in the positions of format and perforations. In special cases where a particular area of the picture is to be masked and projected added trimming or notching may be resorted to, i. e., the corner material may be trimmed off to fit over the pins.

While one embodiment of the invention has been disclosed, it is to be understood that the inventive concept may be carried out in a number of ways. This application is, therefore, not to be limited to the precise details described but is intended to cover all variations and modifications thereof falling within the spirit of the invention and the scope of the claims.

I claim:

1. A film mount having a molded frame, a cover and a mask, said frame and cover being formed from a transparent thermoplastic material the frame having a cavity within which the cover is adapted to fit and at the base of which is provided a recess for the mask, and the said cover having a recess within which the film is held, said frame and cover being retained in assembled relationship by a bond resulting from fusing the material of both frame and cover at the junction between the two.

2. A film mount having a molded frame, a cover and a mask, said frame and cover being formed from a transparent thermoplastic material, the frame having a cavity within which the cover is adapted to fit and at the base of which is provided a recess for the mask, and the said cover having a recess within which the film is held, said frame and cover being retained in assembled relationship by a bond of adhesive applied at the junction between the two.

3. A film mount having a molded frame, a cover and a mask, said frame and cover being formed from a transparent plastic material and comprising a window for protecting the film at each side thereof, the frame having a cavity for reception of the film and in which the cover is adapted to fit and within which it is retained, means by which the film is held against lateral displacement, and a connecting bond between the frame and cover, and means for retaining said mask in position with respect to said cover and frame so that it shall serve as a frame for a scene on said film.

4. A film mount having a molded plastic frame and cover and an opaque mask, said frame and cover being formed from a transparent plastic material, said frame having a cavity within which the cover, film and mask are adapted to be retained, a recess at the base of said cavity for positioning the mask and a recess in the cover for laterally positioning the film, said recesses being so disposed as to locate the film and mask so that a scene on said film shall be located within a border defined by said mask.

5. A film mount having a molded frame and cover and an opaque mask, said frame and cover being formed from a transparent plastic material and having a cooperating interengagement by which they are positioned for assembly including a cavity in the frame within which the cover is adapted to fit, a recess at the base of said cavity for positioning the mask, a recess in the cover for receiving the film and means including a plurality of projections extending from one said molded plastic elements and corresponding openings in the other within which openings said projections engage when the frame and cover are assembled for retaining the film in position so that the outline of a scene thereon shall be defined by the mask when retained in its recess.

6. A film mount having a frame and cover and an opaque mask, said frame and cover being molded from transparent plastic material, said frame comprising a border portion and a recessed portion within the border portion within which are held the mask, film and cover, said frame and cover providing at their central portion a window for protecting the film and through which the film may be illuminated, means within the recess in the frame for retaining the mask, and positioning means between the cover and frame for retaining the film, said window portions in the frame and cover being recessed inwardly from the lateral surfaces at the border portion thereof, said recessed areas being slightly larger than the masked scene and disposed symmetrically thereto.

BRUNO C. ROEHRL.

REFERENCES CITED

The following references are of record in the file of this patent:

UNITED STATES PATENTS

| Number | Name | Date |
|---|---|---|
| 227,658 | Schultz | May 18, 1880 |
| 1,071,226 | Goodsell et al. | Aug. 26, 1913 |
| 1,245,963 | Patterson | Nov. 6, 1917 |
| 1,567,310 | Weeks | Dec. 29, 1925 |
| 1,963,439 | Gutberlet et al. | June 19, 1934 |
| 2,297,285 | Bledsoe | Sept. 29, 1942 |
| 2,338,189 | Libby et al. | Jan. 4, 1944 |
| 2,361,479 | Joffo | Oct. 31, 1944 |